Figure 1:
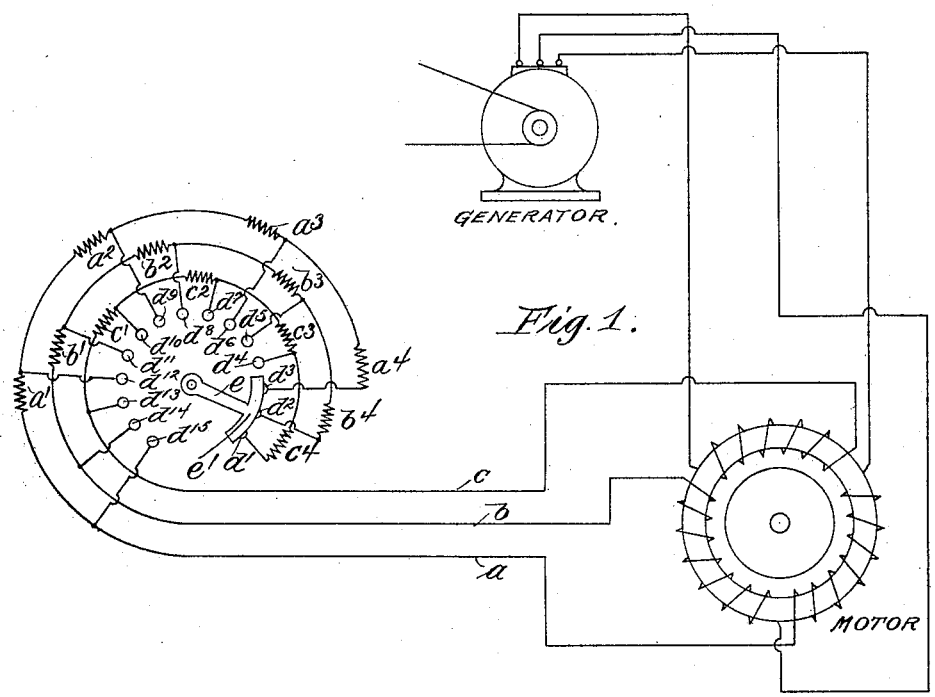

No. 614,394. Patented Nov. 15, 1898.
E. L. K. F. KAHLENBERG.
STARTING RESISTANCE FOR ALTERNATING CURRENT MOTORS.
(Application filed Dec. 30, 1897.)
(No Model.)

Witnesses:

Inventor,
Ernst Ludwig Karl Friedrich Kahlenberg,
By Barton + Brown
Attorneys.

UNITED STATES PATENT OFFICE.

ERNST LUDWIG KARL FRIEDRICH KAHLENBERG, OF BERLIN, GERMANY, ASSIGNOR TO THE SIEMENS & HALSKE ELECTRIC COMPANY OF AMERICA, OF CHICAGO, ILLINOIS.

STARTING RESISTANCE FOR ALTERNATING-CURRENT MOTORS.

SPECIFICATION forming part of Letters Patent No. 614,394, dated November 15, 1898.

Application filed December 30, 1897. Serial No. 664,664. (No model.)

*To all whom it may concern:*

Be it known that I, ERNST LUDWIG KARL FRIEDRICH KAHLENBERG, a subject of the Emperor of Germany, residing at Berlin, Germany, have invented new and useful Improvements in Starting-Boxes for Alternating-Current Motors, (Case No. 69,) of which the following is a specification, reference being had to the accompanying drawings, forming a part of this specification, for which Letters Patent have been granted in Germany, No. 86,854, dated September 24, 1895; in Great Britain, No. 24,264/95, dated December 18, 1895; in Belgium, No. 118,999, dated December 23, 1895; in France, No. 252,623, dated December 20, 1895; in Austria, No. 46/1,710, dated April 28, 1896, and in Sweden, No. 7,550, dated December 14, 1895.

My invention relates to improvements in starting-boxes or controllers for alternating-current motors and to an improved method of starting and controlling such motors, the object of my said invention being to secure a simplification of apparatus for controlling motors operating with single or multiphase alternating currents.

With multiphase motors, where the field-magnets only receive current from the main system, while the current induced by the fields flows within the armature-windings electrically closed upon themselves, the regulation of the torsional or tractive force of the motor is effected by connecting resistances either in the inducing or induced circuit of the motor. Such resistances are also employed in starting the motor and hitherto have been connected to be simultaneously cut in or out in equal amounts from each of the several windings of a multiphase system. In a triphase system, for example, the resistances connected with the inducing-circuit of a motor would be so arranged that each step-by-step movement of the controlling-arm of the starting-box or rheostat would serve simultaneously to cut resistances equal in amount into or out of circuit with the three connecting mains or conductors, each group of resistances being electrically united at their extremities opposite those connected with the field-windings. The operation of a motor accordingly would be controlled by cutting out resistance simultaneously upon starting the motor or when its torsional or tractive power is to be increased, and, conversely, by simultaneously cutting in equal resistances in circuit with the respective field-windings if the motor effect is to be decreased. Up to the present time therefore it has been considered necessary to secure the symmetry or equivalence of electrical resistance in the several or individual circuits of alternating-current systems. This has been accomplished, however, by very greatly increasing the complexity and size of the controlling apparatus of such systems, inasmuch as the corresponding controller for a direct-current system required duplication in proportion to the number of the several circuits in the multiphase system. The device and method of my invention, however, secure the simplification of controlling apparatus, and although involving an asymmetric arrangement of resistances connected at times with the several motor-circuits I have found that the influence upon the action of the motor is not detrimental.

The starting-box of my invention may be briefly described as resembling in its general features that of a direct-current system. Its successive contacts, however, are respectively connected with each of the mains or conductors of the system in rotation, whereby a traveling contact part, preferably adapted to engage and electrically unite a number of contacts corresponding to the several conductors of the system, will successively cut resistance in or out of each of such conductors as the contact part travels over the several contacts of the starting-box, and the method of motor control of my invention consists in thus altering asymmetrically the resistances connected in the several controlled circuits of the motor.

My invention will be more readily understood by reference to the accompanying drawings, wherein—

Figure 2:
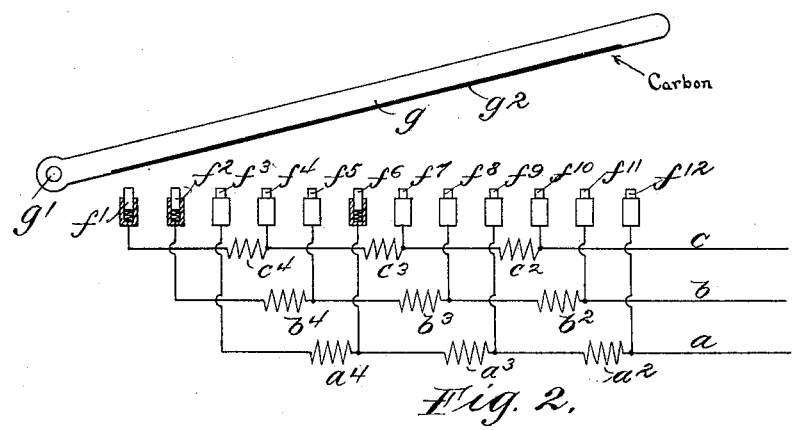

Figure 1 diagrammatically illustrates a controller-box constructed for a triphase system in accordance with my invention, and Fig. 2 also illustrates diagrammatically a slightly-modified form of the same.

The same letter of reference is used to designate like parts in both figures of the drawings.

The mains or conductors $a\ b\ c$ of the starting or controller box are adapted to be connected either with the induced or main circuit of a triphase alternating-current motor. Connected in each of these mains are four groups of resistances $a'\ b'\ c'$ and $a^2\ b^2\ c^2$, &c. Contacts $d'\ d^2\ d^3$, &c., are respectively connected with each of the resistances, the said contacts being circularly disposed in the path of a rotatable contact-arm $e$, having a contact part $e'$ adapted to maintain electrical connection between any three adjacent contacts $d'\ d^2\ d^3$, &c.

With the four groups of resistances indicated in my controller-box it would be possible, when the practice of the prior art is followed, to secure only four step-by-step adjustments of the resistance connected in circuit with the motor and mains $a\ b\ c$, since each step-by-step movement would involve simultaneously cutting in or out three corresponding divisions of one of the groups of resistances, as $a'\ b'\ c'$. It will be seen, however, with my improved starting-box, herein diagrammatically shown, that twelve step-by-step movements are made possible by the employment of the same number of resistances and substantially the same number of contacts as would be used in a controller of the type commonly employed, permitting but four step-by-step movements, serving simultaneously to cut in or out equal resistances from each conductor of a triphase system. For example, the movement of the contact-arm $e$ in a contraclockwise direction will serve to engage the contact part $e'$ first with contact $d^4$, while contact $d'$ will be disengaged, thus cutting resistance $c^4$ out of circuit. The next movement would serve to cut out resistance $b^4$, the next $a^4$, and so on, thus securing three step-by-step movements where one alone would be possible in the usual form of controller. The motor, in accordance with its altered circuit condition, would successively receive more current as each individual division of the resistance $c^4\ b^4\ a^4$ was cut out of circuit and an increase in its torsional or tractive power would be obtained.

As above indicated, the controller or starting box may be connected either in the closed armature-circuit or in circuit with the mains and the field-windings of the triphase motor in a manner well known to those skilled in the art.

Fig. 2 diagrammatically illustrates a device for securing practically the same switching effect as that of Fig. 1, said device, however, readily lending itself to the general type of switch, wherein spring contact parts $f'\ f^2$, &c., are adapted to be successively engaged by a contact strap or bar $g$, pivotally mounted at $g'$, the said contact-strap as the same is moved from one operative position to another thus successively engaging the several spring-contacts $f\ f'\ f^2$ and cutting out corresponding resistances $c^4\ b^4\ a^4$, &c., from the mains or conductors $c\ b\ a$. If desired, a carbon strip $g^2$ may be provided upon the said contact-strap, and metallic contact parts may be used to effect the connection with the mains.

It is apparent that with the form of controlling device herein shown the construction is greatly simplified over that of similar apparatus, securing the simultaneous connection or disconnection of the controlling resistance with the motor, and practice has shown that the operation of the motor when controlled by the starting-box of my invention is, on the whole, more satisfactory than when the commonly-employed form of rheostat is used.

The unequal distribution or asymmetric arrangement of the controlling resistances connected with the several motor-circuits entailed during different operative positions of the rheostat herewith shown does not affect the efficiency of the motor. The current variation has by experiment been found to be minimized when the simpler apparatus of my invention is used as a controller.

I have purposely omitted from the above description details and the enumeration of many modifications which may be made without departing from the principles of my invention; but, Having fully set forth and diagrammatically illustrated a type of controller and the method of motor control perfected in accordance with my said invention, I claim and desire to secure by these Letters Patent, together with all such modifications as may be made with mere skill and with only the limitations expressed or by law implied in view of the state of the related arts, the following:

1. In a controlling-rheostat for alternating-current systems, the combination with a plurality of conductors connected with individual circuits of said system, of groups of resistance respectively connected with said conductors, contacts respectively connected with each of the divisions of said groups, and a contact arm or part adapted successively to cut into or out of circuit the several groups of resistance, division by division, whereby the resistance connected in circuit with each conductor is successively altered, substantially as described.

2. The combination in a controller or rheostat for alternating-current systems, with a plurality of mains or conductors respectively connected with separate or individual circuits, of groups of resistance respectively connected with the said conductors, contacts connected with divisions of the several groups of resistance, and a contact arm or part adapted to engage the said contacts and effect the asymmetrical alteration of the resistance connected in circuit with the several mains or conductors, substantially as and for the purpose described.

3. In a rheostat or controller for alternating-current systems, the combination with a plurality of mains $c\ b\ a$ respectively connected with said system, groups of resistance $c^4\ b^4\ a^4$, $c^3\ b^3\ a^3$, &c., respectively connected with said mains, contacts $d'\ d^2\ d^3$, &c., respectively connected with individual divisions of said resistance, and a contact arm or part $e'$ adapted successively to be moved into and out of engagement with said contacts, whereby the resistance connected with the several mains is asymmetrically altered, substantially as described.

4. The combination in a rheostat or controller for alternating-current systems, with a movable contact part $e'$, of contacts $d'\ d^2\ d^3$, &c., disposed in the path of said contact part and adapted to be successively engaged thereby, resistances $c^4\ b^4\ a^4$, $c^3\ b^3\ a^3$, &c., respectively connected with said contacts and with separate or individual controlled circuits of said system, said resistances being thereby adapted to be successively connected with and disconnected from their respective circuits by the movement of the contact $e'$, whereby the connected resistance in the several circuits is asymmetrically altered to control the operation of the system, substantially as described.

5. In a controller or rheostat for alternating-current motors, the combination with mains or conductors $c\ b\ a$ associated with separate or individual circuits of the controlled motor, of groups of resistance $c^4\ b^4\ a^4$, $c^3\ b^3\ a^3$, &c., respectively connected with the said mains or conductors, contacts $d'\ d^2\ d^3$, &c., connected respectively with separate divisions of the groups of resistance, and a contact part $e'$ adapted to be moved over the said contacts and electrically unite a predetermined number thereof, whereby the resistance connected with the circuits of the controlled motor is asymmetrically altered, substantially as described.

6. The method of effecting the control of alternating-current dynamo-electric machines, which consists in altering asymmetrically the several groups of resistance connected in the individual circuits of said dynamo-electric machine, whereby its operative condition is governed, substantially as described.

7. The herein-described method of controlling an alternating-current motor, which consists in supplying said motor with suitable alternating current adapted to actuate the same, directing the said current through groups of resistance connected with the several circuits of the motor, and controlling the operative condition of the motor by asymmetrically altering the resistance connected with its several circuits.

8. The method of motor control consisting in supplying an alternating-current motor with an actuating-current, directing the said current to the separate motor-circuits through corresponding groups of controlling resistance, and asymmetrically altering the divisions of the several groups of resistance connected with the separate motor-circuits, whereby the operative condition of the motor is changed, substantially as described.

In testimony whereof I affix my signature in the presence of two witnesses.

ERNST LUDWIG KARL
FRIEDRICH KAHLENBERG.

Witnesses:
CHARLES H. DAY,
HENRY HASPER.